United States Patent
Schlueter, Jr. et al.

(10) Patent No.: US 6,498,918 B1
(45) Date of Patent: *Dec. 24, 2002

(54) POLYTHIOPHENE FILLED XEROGRAPHIC COMPONENT COATINGS

(75) Inventors: Edward L. Schlueter, Jr., Rochester, NY (US); James F. Smith, Ontario, NY (US); Lucille M. Sharf, Pittsford, NY (US)

(73) Assignee: Xerox Corporation, Stamford, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/340,609

(22) Filed: Jun. 28, 1999

(51) Int. Cl.$^7$ .................. G03G 15/02; G03G 15/16; G03G 15/20

(52) U.S. Cl. .................. 399/308; 399/174; 399/320; 399/328

(58) Field of Search .................. 399/168, 174, 399/175, 302, 308, 320, 328; 252/500

(56) References Cited

U.S. PATENT DOCUMENTS

| | | | |
|---|---|---|---|
| 5,298,956 A | | 3/1994 | Mammino et al. .......... 355/275 |
| 5,410,392 A | * | 4/1995 | Landa ..................... 399/308 |
| 5,761,595 A | * | 6/1998 | Tarnawskyj et al. ........ 399/308 |
| 5,766,515 A | * | 6/1998 | Jonas et al. .............. 252/500 |
| 5,805,961 A | * | 9/1998 | Mizoe et al. .............. 399/174 |
| 5,873,018 A | * | 2/1999 | Aoto et al. ............... 399/302 |
| 5,922,440 A | * | 7/1999 | Schlueter et al. ........ 399/308 X |
| 6,004,483 A | * | 12/1999 | Jonas et al. .............. 252/500 |

FOREIGN PATENT DOCUMENTS

JP 4-67068 3/1992

OTHER PUBLICATIONS

Baytron®: "Today's conductivity for tomorrow's users", 7 pages.
Bayer Product Information Sheet for Baytron®M, publication date 02/95, pp. 1–6.
Bayer Product Information Sheet for Baytron, entitled "BAYTRON® Intrinsically Conductive Coatings", publication date 04/95, pp. 1–6.

* cited by examiner

Primary Examiner—Fred L. Braun
(74) Attorney, Agent, or Firm—Annette L. Bade

(57) ABSTRACT

A xerographic component including an intermediate transfer, fusing and/or biasing component, wherein one or more of each component may have a substrate and thereover a polymer coating with a thiophene filler dispersed or contained therein, and also an image forming apparatus for forming images on a recording medium having a charge-retentive surface to receive an electrostatic latent image thereon; a biasable component capable of receiving an electrical bias for charging one of a xerographic component or copy substrate surface; a development component to apply toner to the charge-retentive surface to develop the electrostatic latent image to form a developed image on the charge retentive surface; a transfer component to transfer the developed image from the charge retentive surface to a copy substrate; and a fuser component for fusing the developed image to a surface of the copy substrate, wherein at least one of the biasable component, transfer component and the fuser component have a) a substrate; and thereon b) a coating having a thiophene filler dispersed therein and an image forming apparatus including such xerographic component including an intermediate transfer, fusing and/or biasing component, and including a charge retentive surface, a biasable component, a development component, a transfer component, and a fuser component.

21 Claims, 8 Drawing Sheets

POLYTHIOPHENE FILLED XEROGRAPHIC COMPONENT COATINGS

BACKGROUND OF THE INVENTION

The present invention relates to thiophene filled material coatings for xerographic components useful in xerographic applications including digital, image on image, and contact electrostatic applications. In particular, the present invention relates to thiophene filled material coatings for transfer/transfuse, intermediate transfer, bias charging, bias transfer, fusing, and like xerographic components. In embodiments, the thiophene filled material coatings can be useful as outermost coatings, intermediate coatings, or as adhesives between other polymer layers. Also, the thiophene filled material coatings can be useful in both dry and liquid toner applications and in color toner applications. The thiophene filled material coatings, in embodiments, allow for adjusting and controlling desired resistivity, and also allow for increased temperature, hydrolytic, and good light stability. The thiophene filled material coatings are easily fabricated and have increased stability.

The electrical property of many xerographic components such as transfer members, biasable members, fusing members, transfuse members and other like xerographic components, is a very important characteristic of the xerographic component. If desired electrical properties of a xerographic component are not obtained, a multitude of copy or print failures can occur. Examples of these adverse results include decrease in copy quality, copy quality defects, print failure, and decrease in the life of the xerographic component. Most of these adverse results are due to ineffective toner release caused by the xerographic component not possessing the desired resistivity. The adverse results often also occur when the xerographic component does not retain its desired resistivity over time.

One type of xerographic component is a transfer member including intermediate transfer and transfix components. Transfer/transfix members allow for positive attributes such as enabling high throughput at modest process speeds, improving registration of the final color toner image in color systems using synchronous development of one or more component colors using one or more transfer stations, and increasing the range of final substrates that can be used. However, a disadvantage of using a transfer/transfix member is that a plurality of transfer steps is required allowing for the possibility of charge exchange occurring between toner particles and the transfer member which ultimately can lead to less than complete toner transfer. The result is low resolution images on the image receiving substrate and image deterioration. When the image is in color, the image can additionally suffer from color shifting and color deterioration. In addition, the incorporation of charging agents in liquid developers, although providing acceptable quality images and acceptable resolution due to improved charging of the toner, can exacerbate the problem of charge exchange between the toner and the intermediate transfer member.

Preferably, the resistivity of the transfer/transfix member is within a preferred range to allow for sufficient transfer. It is also important that the intermediate transfer or transfix member have a controlled resistivity, wherein the resistivity is virtually unaffected by changes in humidity, temperature, bias field, and operating time. In addition, a controlled resistivity is important so that a bias field can be established for electrostatic transfer. It is important that the transfer/transfix member not be too conductive as air breakdown can possibly occur.

Other xerographic components include charging devices. Contact charging or bias charging members function by applying a voltage to the charge-receiving member (photoconductive member). Such bias charging members require a resistivity of the entire charging member within a desired range. Specifically, materials with too low resistivities will cause shorting and/or unacceptably high current flow to the photoconductor. Materials with too high resistivities will require unacceptably high voltages. Other problems which can result if the resistivity is not within the required range include low charging potential and non-uniform charging, which can result in poor image quality.

Therefore, it is desired in biasable members, that the resistivity be tailored to a desired range and that the resistivity remain within this desired range. Accordingly, it is desirable that the resistivity be unaffected or virtually unaffected to changes in temperature, relative humidity, running time, and leaching out of contamination to photoconductors.

Fusing the toner to a copy substrate is an important step in the xerographic process and fuser members are another type of xerographic component. It is important in the fusing process that minimal or no offset of the toner particles from the support to the fuser member take place during normal operations. Toner particles offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release property of the fuser, and accordingly it is desired to provide a fusing surface which has a low surface energy to provide the necessary release. To ensure and maintain good release properties of the fuser, it has become customary to apply release agents to the fuser roll during the fusing operation. Typically, these materials are applied as thin films of, for example, silicone oils to prevent toner offset.

It is desirable that upon fusing, virtually no toner is left on the fuser member, and if so, subsequent copies will be contaminated. Therefore, it is desired to increase release properties of the fuser member.

Efforts have been made to tailor resistivity of xerographic components, and to obtain controlled resistivity of these components once the desired resistivity is attained. These methods have included adding conductive fillers or carbon black to the outer layer. While addition of ionic additives to elastomers may partially control the resistivity of the elastomers to some extent, there are problems associated with the use of ionic additives. In particular, undissolved particles frequently appear in the elastomer which causes an imperfection in the elastomer. This leads to a nonuniform resistivity, which in turn, leads to poor transfer properties and poor mechanical strength. Furthermore, bubbles appear in the conductive elastomer. These bubbles provide the same kind of difficulty as the undissolved particles in the elastomer namely, poor or nonuniform electrical properties, poor mechanical properties such as durometer, tensile strength, elongation, a decrease in the modulus and a decrease in the toughness of the material. In addition, the ionic additives themselves are sensitive to changes in temperature, humidity, operating time and applied field. These sensitivities often limit the resistivity range. For example, the resistivity usually decreases by up to two orders of magnitude or more as the humidity increases from 20% to 80% relative humidity. This effect limits the operational or process latitude. Moreover, ion transfer can also occur in these systems. The transfer of ions will lead to contamination problems, which in turn, can reduce the life of the machine. Ion transfer also increases the resistivity of the member after repetitive use. This can limit the process and operational latitude and eventually, the ion-filled component will be unusable.

Conductive particulate fillers, such as carbons, have also been used in an attempt to control the resistivity. Generally, carbon additives control the resistivities and provide stable resistivities upon changes in temperature, relative humidity, running time, and leaching out of contamination to photoconductors. However, carbon particles disperse poorly in elastomers. Further, the required tolerance in the filler loading to achieve the required range of resistivity has been extremely narrow. This along with the large "batch to batch" variation leads to the need for extremely tight resistivity control. In addition, carbon filled surfaces have typically had very poor dielectric strength and sometimes significant resistivity dependence on applied fields. This leads to a compromise in the choice of centerline resistivity due to the variability in the electrical properties, which in turn, ultimately leads to a compromise in performance. Adding carbon black has also resulted in many problems including the necessity to have thick films and the inability to obtain transparent coatings.

Therefore, it is desirable to provide xerographic components, wherein the resistivity of the coatings can be tailored and controlled. In addition, it is desired to provide xerographic components having an outer layer which has a relatively high stability, is easily fabricated, and has relatively high transparency.

SUMMARY OF THE INVENTION

Embodiments of the present invention include: a xerographic component comprising: a) a substrate; and thereon b) a coating comprising a polymer having a thiophene filler dispersed therein. In an optional embodiment, an intermediate layer is positioned between the substrate and outer thiophene filled layer. In yet another embodiment, an outer coating is positioned on the thiophene filled material.

Embodiments also include: a xerographic component comprising: a) a substrate comprising a polymer; and thereon b) a coating comprising a polymer having a thiophene filler dispersed therein.

Embodiments also include: an image forming apparatus for forming images on a recording medium comprising: a charge-retentive surface to receive an electrostatic latent image thereon; a biasable component capable of receiving an electrical bias for charging one of a xerographic component or a copy substrate; a development component to apply toner to the charge-retentive surface to develop the electrostatic latent image to form a developed image on the charge retentive surface; a transfer component to transfer the developed image from the charge retentive surface to a copy substrate; and a fuser component for fusing the developed image to a surface of the copy substrate, wherein at least one of the biasable component, transfer component and the fuser component comprise: a) a substrate; and thereon b) a coating comprising a polymer having a thiophene filler dispersed therein.

BRIEF DESCRIPTION OF THE DRAWINGS

For a better understanding of the present invention, reference may be had to the accompanying figures.

DETAILED DESCRIPTION OF THE PRESENT INVENTION

Figure 1:
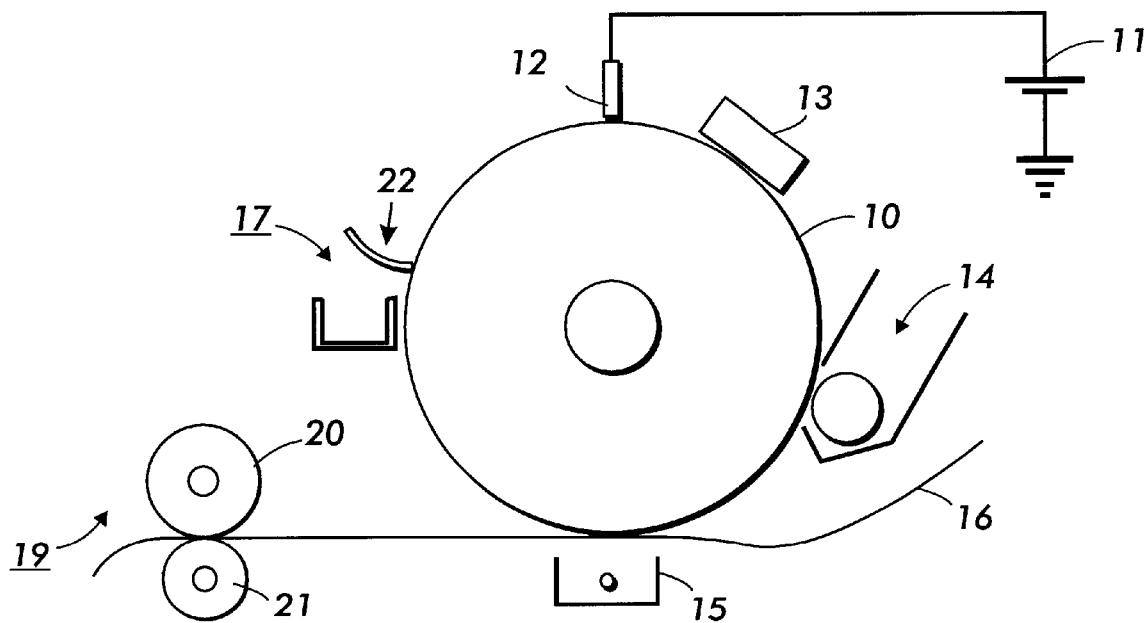
FIG. 1 is an illustration of a general electrostatographic apparatus.

The present invention relates to thiophene filled coatings useful for xerographic components. The xerographic components are useful in xerographic or electrostatographic, including image-on-image, digital, and contact electrostatic printing, applications. The xerographic components include, but are not limited to fuser members including fusing or fixing members, donor members, pressure members, and the like; transfer members including bias transfer, intermediate transfer, transfix members and the like; charging members including bias charging members and the like; document handling members; and like members.

Generally, the process of electrostatographic copying is initiated by exposing a light image of an original document onto a substantially uniformly charged photoreceptive member. Exposing the charged photoreceptive member to a light image discharges a photoconductive surface thereon in areas corresponding to non-image areas in the original document while maintaining the charge in image areas, thereby creating an electrostatic latent image of the original document on the photoreceptive member. This latent image is subsequently developed into a visible image by depositing charged developing material such as toner onto the photoreceptive member such that the developing material is attracted to the charged image areas on the photoconductive surface. Thereafter, the developing material, and more specifically toner, is transferred from the photoreceptive member to a copy sheet or to some other image support substrate to create an image which may be permanently affixed to the image support substrate, thereby providing an electrophotographic reproduction of the original document. In a final step in the process, the photoconductive surface of the photoreceptive member is cleaned to remove any residual developing material which may be remaining on the surface thereof in preparation for successive imaging cycles.

Various components useful in the electrophotographic or electrostatographic process will be described.

Biasable members include both bias transfer members and bias charging members. Toner material can be transferred from a first image support surface (i.e., a photoreceptor) into attachment with a second image support substrate (i.e., a copy sheet) under the influence of electrostatic force fields generated by an electrically biased member, wherein charge is deposited on the second image support substrate by, for example, a bias transfer member or by spraying the charge on the back of the substrate.

Regarding the transfer of toner, after the developer material is advanced into contact with the electrostatic latent image and the toner particles are deposited thereon in image configuration, the developed image can be transferred to a copy sheet. It is advantageous to transfer the developed image to a coated intermediate transfer web, belt or component, and subsequently transfer with very high transfer efficiency the developed image from the intermediate transfer member to a permanent substrate.

After the toner image is transferred to a copy sheet via an intermediate transfer member, the toner image is fused or fixed to the copy sheet with heat. Several approaches to thermal fusing of electroscopic toner images include providing the application of heat and pressure substantially concurrently by various means, a roll pair maintained in pressure contact, a belt member in pressure contact with a roll, a belt member in pressure contact with a heater, and the like. Heat may be applied by heating one or both of the rolls, plate members, or belt members. The fusing of the toner particles takes place when the proper combination of heat, pressure and contact time are provided. The balancing of these parameters to enable the fusing of the toner particles is well known in the art, and can be adjusted to suit particular machines or process conditions.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 20 and pressure member 21, thereby forming a permanent image. Photoreceptor 10, subsequent to transfer, advances to cleaning station 17, wherein any toner left on photoreceptor 10 is cleaned therefrom. Shown in FIG. 1 is a cleaning blade 22, although other methods of cleaning such as brush cleaning, web cleaning, bias cleaning, or other like and known cleaning methods may be used.

Figure 2:
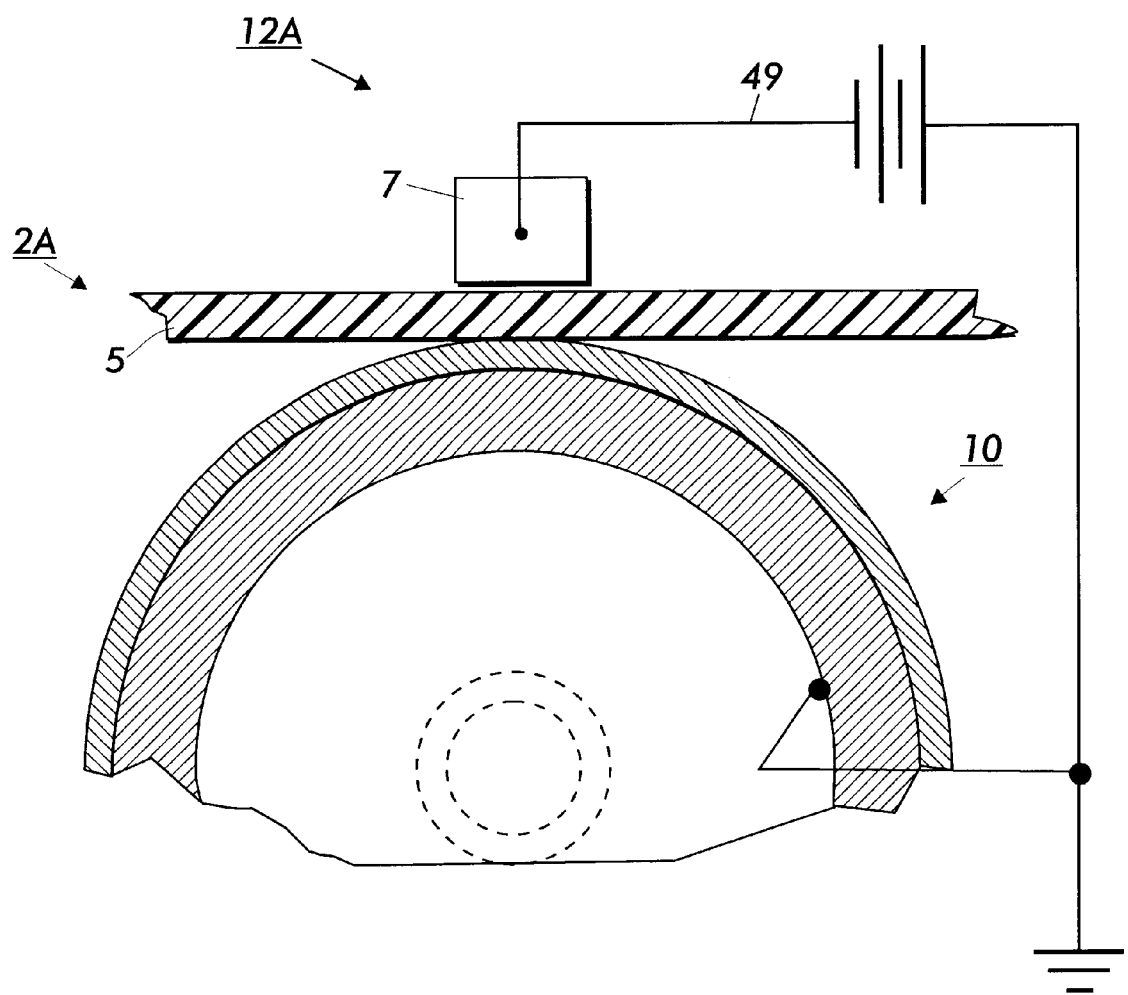
FIG. 2 is a schematic view of an image development system containing a bias charging member.

FIG. 2 demonstrates an embodiment of the present charging system including a bias charging device 12A having a charge member 2A held in contact with an image carrier implemented as a photoconductive drum 10. However, the present invention can also be used for charging a dielectric receiver or other suitable member to be charged. The photoconductive member 10 may be a drum or a belt or other known photoconductive member. A DC voltage and optional AC current is applied from a power source 49 to the charge member 2A to cause it to charge the photosensitive member 10. The power is either directly supplied to charge member 2A or is supplied to charge belt 2A via a bias supplying member 7. The charge member 2A has an outer thiophene filled material layer 5.

Figure 3:
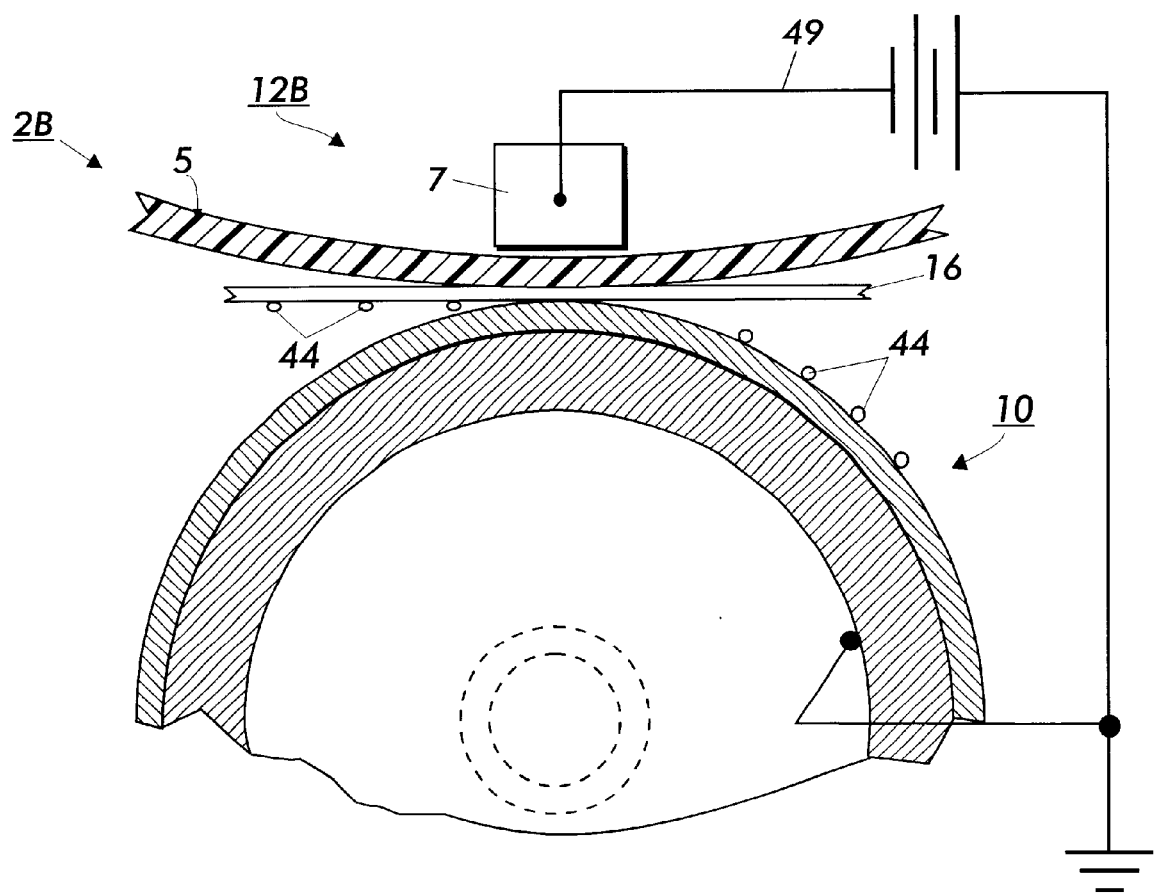
FIG. 3 is a schematic view of an image development system containing a bias transfer member.

FIG. 3 demonstrates an embodiment of the present transfer system including a bias transfer device 12B having a bias transfer member 2B held in contact with an image carrier implemented as a photoconductive drum 10. The photoconductive member 10 may be in the form of a belt or drum or other suitable photoconductive member. A DC voltage and optional AC current is applied from a power source 49 to the bias transfer member 2B to cause it to charge the back side of the copy substrate 16 so as to attract toner 44 from photoreceptor 10 to copy substrate 16. The power is either directly supplied to bias transfer member 2B or is supplied to bias transfer member 2B via a bias supplying member 7. The bias transfer member 2B has an outer thiophene filler material layer 5.

A bias can be supplied to the biasable member in various ways. A bias may be supplied to the biasable member through another biasable member such as a biasable supplying member (for example, element 7 in FIG. 2) capable of receiving a bias from an electrical bias source (such as 11 in FIG. 1, wherein the electrical bias source is connected to the bias supplying member for directing or supplying electrical current thereto, and wherein the bias supplying member is capable of transferring or supplying the charge to the bias charging member or bias transfer member. The biasable supplying member may be in direct contact or in charging contact with said biasable transfer or biasable charging member so that the biasable charging member or biasable transfer member is capable of receiving and transferring or spraying the charge to a substrate, such as a photoreceptor or copy substrate. In an alternative embodiment, the bias may be directly supplied to the bias charging member or bias transfer member.

As set forth above, the biasable member may be in the form of a roller, belt, sheet, sleeve, or film. The bias may be applied through shafts, for example, stainless steel shafts. One advantage of using a belt embodiment, is that one can engineer a larger pre-nip and post-nip region. For AC/DC operation, when a DC bias has exceeded a certain limit, micro-corona may be generated in both the pre-nip and the post-nip regions, which may result in charging of the photoreceptor. A larger pre-nip and post-nip region can increase the efficiency of photoreceptive charging. Therefore, a belt configuration for the biasable member is preferred.

The bias is typically controlled by use of a DC potential, and an AC potential is typically used along with the DC controlling potential to aid in charging control. The advantage of using AC lies in the reduction of the surface contamination sensitivity and to ensure that the charging is uniform. The AC creates a corona in the pre- and post-nip regions of the devices so that the charging component related to the charge injection in the nip is less important. The AC bias system is proportional to the process speed. This sometimes limits the application of bias devices to low speed machines. Use of AC in addition to DC increases the cost of the system. Therefore it is desirable to use only a DC.

However, use of only DC bias usually requires materials with an optimum, stable resistivity. Otherwise, use of a single DC bias will result in charging non-uniformity and pre-nip breakdown.

Since the present surfaces, in embodiments, allow for optimum and stable resistivities as set forth herein, the biasable member of the present invention may only include a DC bias charging system, without the need for an AC bias. In addition, the present invention can be used with electrode field tailoring with an electrode substrate, or with double bias field tailoring without electrodes. These latter two approaches are useful with a stationary film charging system or bias transfer films.

Figure 4:
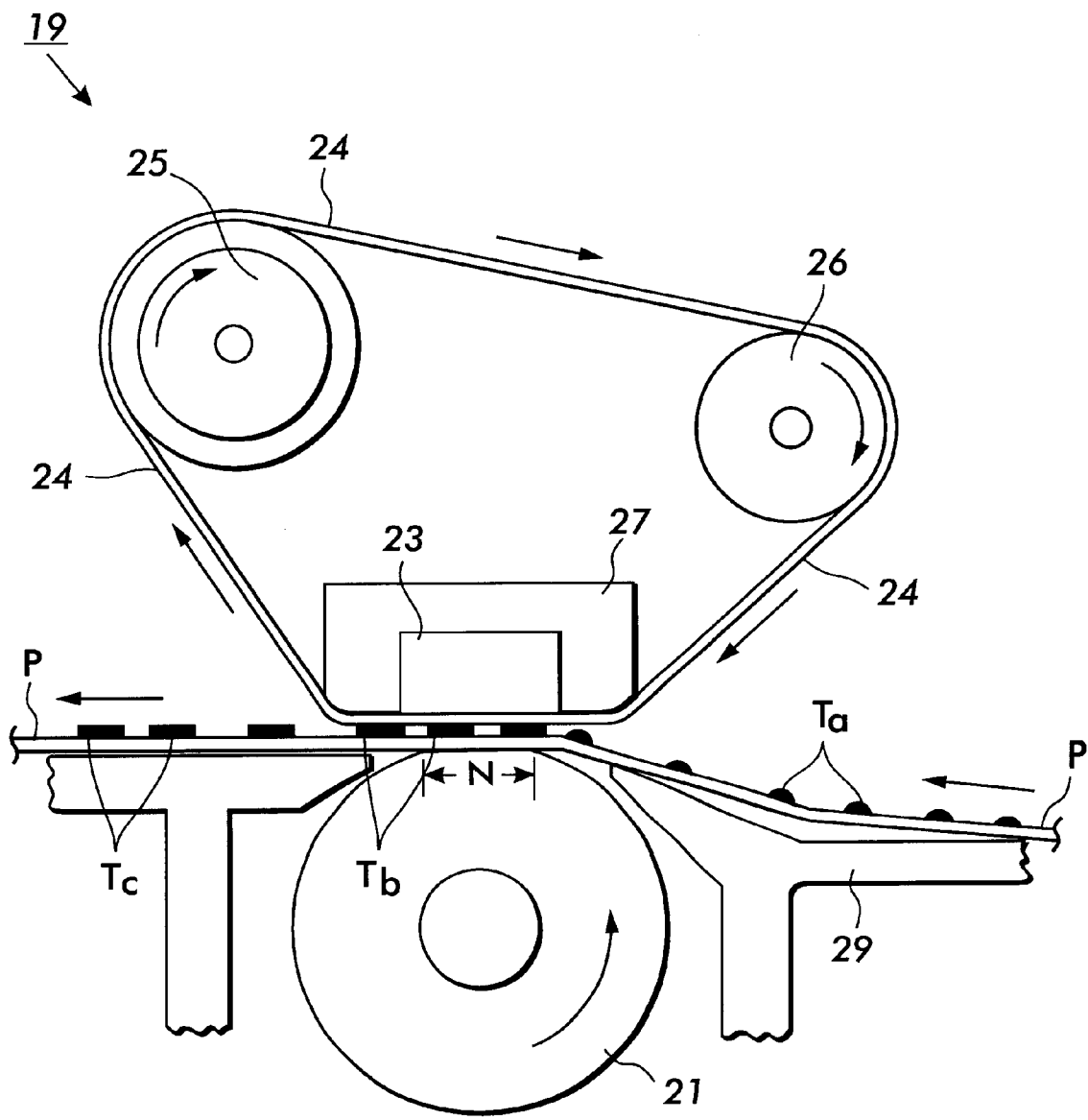
FIG. 4 is a schematic view of an image development system containing a fuser belt in combination with a pressure roller.

FIG. 4 shows a sectional view of an example of a fusing station 19 having a heating apparatus according to an embodiment of the present invention. In FIG. 4; a heat resistive film or an image fixing film 24 in the form of an endless belt is trained or contained around three parallel members, i.e., a driving roller 25, a follower roller 26 of metal and a low thermal capacity linear heater 23 disposed between the driving roller 25 and the follower roller 26. A pressing roller 21 is press-contacted to the heater 23, having heater base 27, with the bottom travel of the fixing film 24 therebetween.

Upon an image formation start signal, an unfixed toner image is formed on a recording material at the image forming station. The recording material sheet P having an unfixed toner image Ta thereon is guided by a guide 29 to enter between the fixing film 24 and the pressing roller 21 at the nip N (fixing nip) provided by the heater 23 and the pressing roller 21. Sheet P passes through the nip between the heater 23 and the pressing roller 21 together with the fixing film 24 without surface deviation, crease or lateral shifting while the toner image carrying surface is in contact with the bottom surface with the fixing film 24 moving at the same speed as sheet P. The heater 23 is supplied with electric power at a predetermined timing after generation of the image formation start signal so that the toner image is heated at the nip so as to be softened and fused into a softened or fused image Tb. Sheet P is then discharged to the sheet discharging tray. By the time Sheet P is discharged, the toner has sufficiently cooled and solidified and therefore is completely fixed (toner image Tc).

Figure 5:
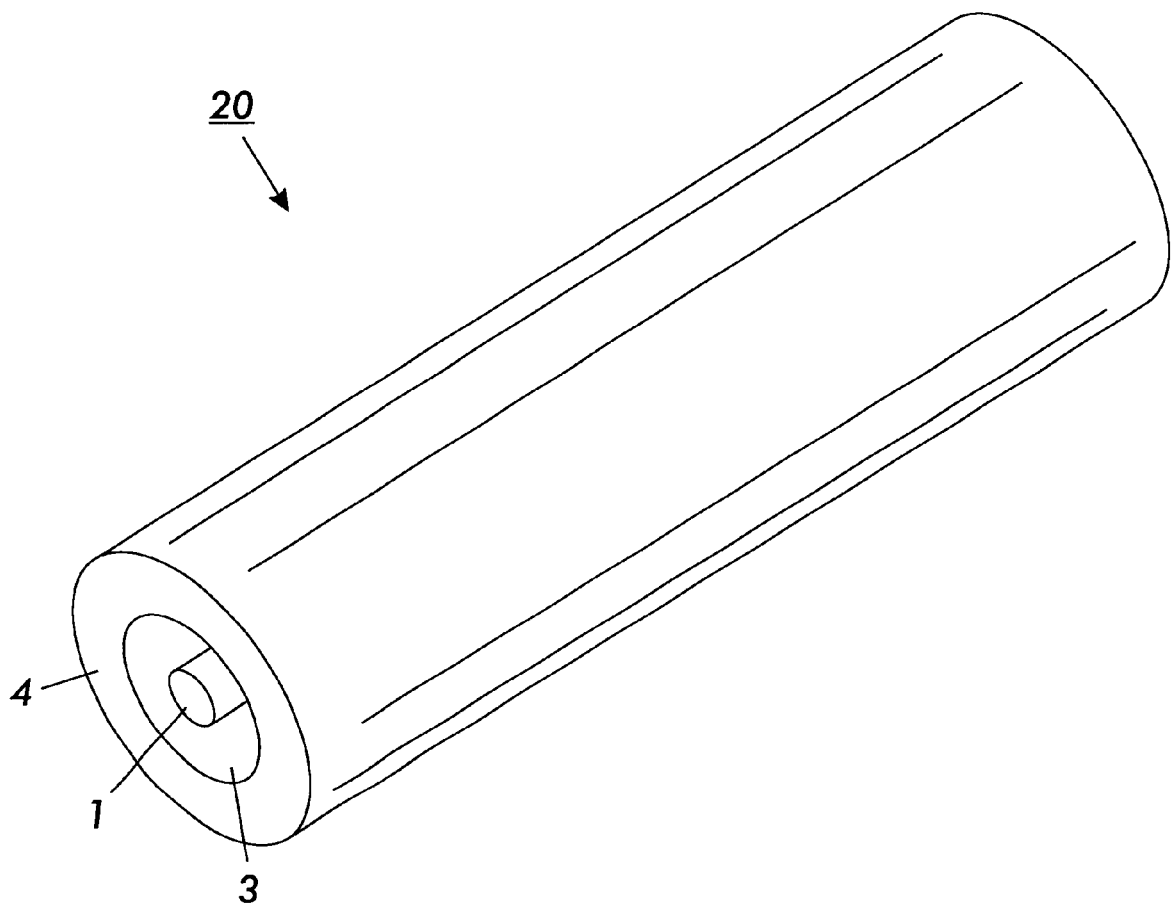
FIG. 5 is an elongated view of a cylindrical fuser roller.

FIG. 5 demonstrates a fusing member 20 in the form of a cylindrical member, having internal heater 1 (although the heater may be external, or both internal and external), substrate 3 and outer thiophene filled material layer 4.

Figure 6:
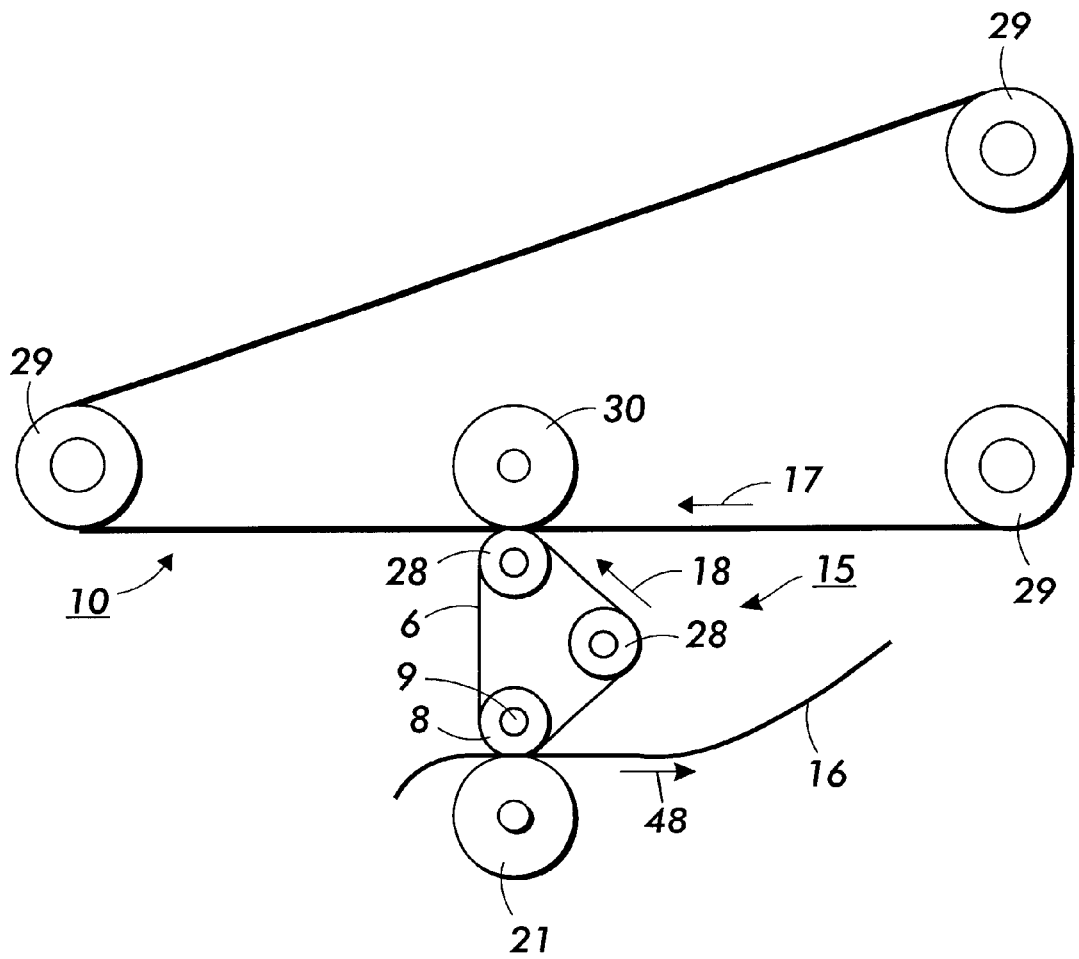
FIG. 6 is a schematic view of an image development system containing a transfix member.

Transfer and fusing may occur simultaneously in a transfix configuration. As shown in FIG. 6, a transfer apparatus 15 is depicted as transfix belt 6 being held in position by driver rollers 28 and heated roller 8. Heated roller 8 comprises a heater element 9. Transfix belt 6 is driven by driving rollers 28 in the direction of arrow 18. The developed image from photoreceptor 10 (which is driven in direction 17 by rollers 29) is transferred to transfix belt 6 when contact with photoreceptor 10 and belt 6 occurs. Pressure roller 30 aids in transfer of the developed image from photoreceptor 10 to transfix belt 6. The transferred image is subsequently transferred to copy substrate 16 and simultaneously fixed to copy substrate 16 by passing the copy substrate 16 in the direction of arrow 48 between belt 6 (containing the developed image) and pressure roller 21. A nip is formed by heated roller 8 and pressure roller 21.

Figure 7:
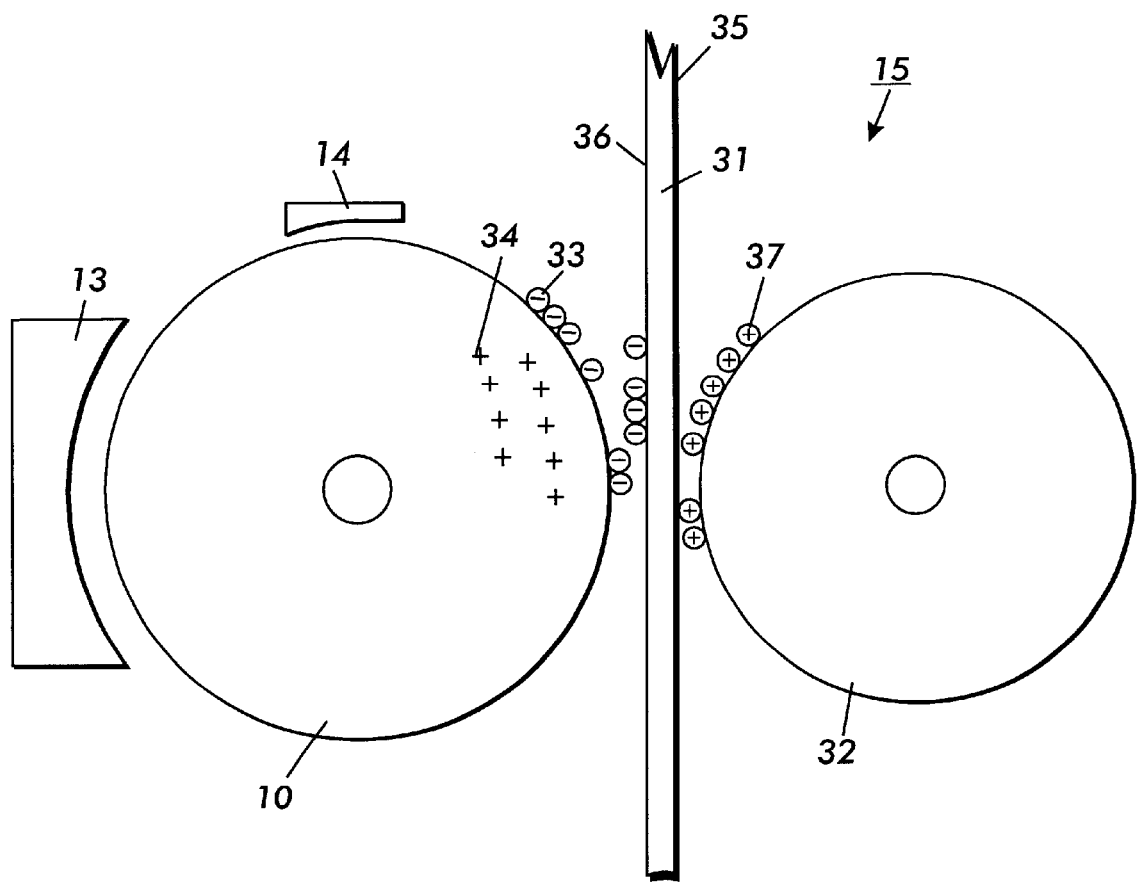
FIG. 7 is a schematic view of an image development system containing an intermediate transfer member.

FIG. 7 demonstrates another embodiment of the present invention and depicts a transfer apparatus 15 comprising an intermediate transfer member 31 positioned between an imaging member 10 and a transfer roller 32. In the multi-imaging system of FIG. 7, each image being transferred is formed on the imaging drum by image forming station 13, and then developed at developing station 14 and transferred to intermediate transfer member 31. Each of the images may be formed on the photoreceptor drum 10 and developed sequentially and then transferred to the intermediate transfer member 31. In an alternative method, each image may be formed on the photoreceptor drum 10, developed, and transferred in registration to the intermediate transfer member 31. Specifically, the charged toner particles 33 from the developing station 14 are attracted and held by the photoreceptor drum 10 because the photoreceptor drum 10 possesses a charge 34 opposite to that of the toner particles 33. In FIG. 7, the toner particles are shown as negatively charged and the photoreceptor drum 10 is shown as positively charged. These charges can be reversed, depending on the nature of the toner and the machinery being used.

A biased transfer roller 32 positioned opposite the photoreceptor drum 10 has a higher voltage than the surface of the photoreceptor drum 10. Biased transfer roller 32 charges the backside 35 of intermediate transfer member 31 with a positive charge 37. In an alternative embodiment of the invention, a corona or any other charging mechanism may be used to charge the backside 35 of the intermediate transfer member 31. The negatively charged toner particles 33 are attracted to the front side 36 of the intermediate transfer member 31 by the positive charge 37 on the backside 35 of the intermediate transfer member 32.

Preferably, a thiophene filled polymer material is used as an outer layer on a xerographic component.

Preferably, the thiophene filler is a conductive material. More preferably, the thiophene filler has the following Formula I:

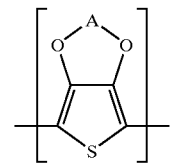

wherein A denotes an optionally substituted $C_1$–$C_4$ alkylene radical, such as, for example, methylene, ethylene, propylene, butylene or the like, and preferably is an optionally alkyl-substituted methylene radical, an optionally $C_1$–$C_{12}$ alkyl- or phenyl-substituted 1,2-ethylene radical, or a 1,2-cyclohexylene radical. Preferably, the thiophene filler material is built from structural units of Formula I. Examples of optionally substituted $C_1$–$C_4$-alkylene radicals include 1,2-alkylene radicals which are derived from 1,2-dibromoalkanes, as can be obtained on bromination of α-olefins, such as ethene, 1-propene, 1-hexene, 1-octene, 1-decene, 1-dodecene and styrene; in addition, the 1,2-cyclohexylene, 2,3-butylene, 2,3-dimethylene, 2,3-butylene and 2,3-pentylene radical may be mentioned. Preferred radicals are methylene, 1,2-ethylene and 1,2-propylene radicals for this embodiment. A particularly preferred thiophene filler material is 3,4-ethylene dioxythiophene (EDT), which is commercially available as BAYTRON® M from Bayer Industrials Chemicals Division, Pittsburgh, Pa. In another embodiment, the thiophene filler materials are polyethylene dioxythiophenes. Details of the compound of Formula I, and the process for making it can be found in U.S. Pat. No. 5,035,926, the subject matter of which is hereby incorporated by reference in its entirety.

The thiophene filled layer may also be used as an intermediate layer or an adhesive layer. Preferred thiophene fillers which possesses excellent adhesive characteristics include polyethylene dioxythiophenes. Examples of polyethylene dioxythiophenes include a composition comprising a mixture of polyethylene dioxythiophene and polystyrene sulfonic acid, for example, radicals having the following Formulas II and III which together depict polyethylene dioxythiophene polystyrene sulphonate (PEDT/PSS):

(Formula II)

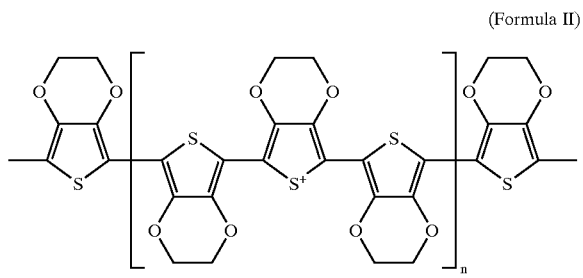

wherein n in Formula II is a number of from about 1 to about 1000, preferably from about 1 to about 100, and (Formula III)

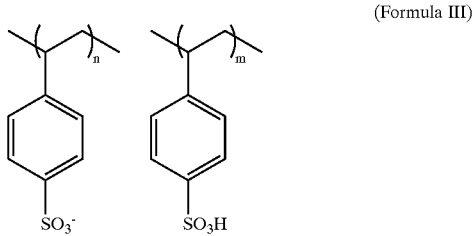

wherein n in Formula II, n is a number of from about 1 to about 100, preferably from about 1 to about 50. A composition comprising Formula II in combination with Formula III is commercially available as BAYTRON® P from Bayer.

Preferably, the thiophene filled material is present in an outer layer or as an intermediate layer or adhesive. The thiophene filler is present in the layer in an amount of from about 0.1 to about 25 weight percent, preferably from about 0.5 to about 15 percent by weight. Total solids, as used herein, refers to the total amount of solid material, including fillers, polymers and additives, in the layer. Additional additives and/or fillers may be present in the outer layer or intermediate thiophene filled material layer. Specifically, additives that may be useful include those listed in columns 6–8 of U.S. Pat. No. 5,298,956, the disclosure of which is hereby incorporated herein in its entirety. In a preferred embodiment, a particulate filler is not incorporated into the surface coating. However, particles and conductive controlling additives can be mixed with thiophene fillers to achieve a range of conductivity.

It is theorized that the filler may crosslink or become bonded with the layer material, instead of dispersing in the material.

Figure 8:
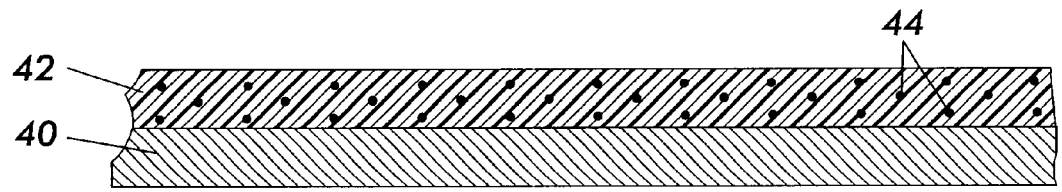
FIG. 8 is a sectional view of a xerographic component having a thiophene filled outer layer.
Figure 9:
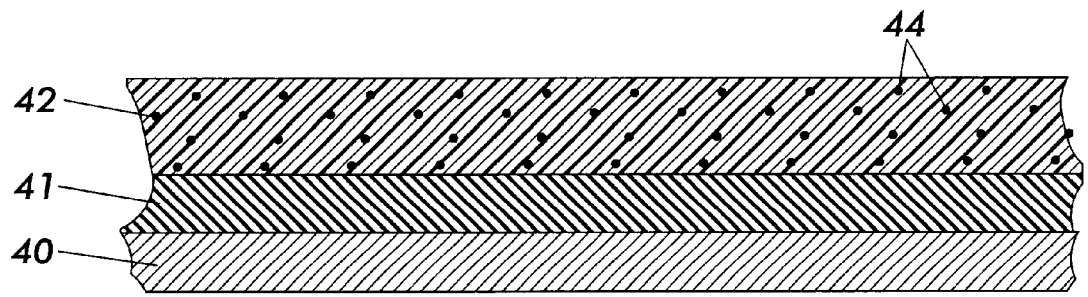
FIG. 9 is a sectional view of a xerographic component having an optional intermediate layer and outer thiophene filled layer.

An embodiment wherein the thiophene filled material is used as the outer layer of a xerographic component is depicted in FIGS. 8 and 9. In FIG. 8, substrate 40 has outer layer 42 present on substrate 40 (FIG. 8). Outer layer 42 is filled with thiophene filler 44. In FIG. 9, the xerographic component comprises substrate 40, and thereover intermediate layer 41, and thereover outer layer 42. Outer layer 42 has thiophene filler 44 dispersed or contained therein.

In an embodiment wherein the thiophene filled material is used as the outer layer of a xerographic component, it is desired that the xerographic component comprise a substrate. Suitable substrates for the xerographic components include rolls, belts, sheets, films, webs, foils, strips, coils, endless strips, circular discs, or the like. If the component is in the form of a belt, it may include an endless belt, an endless seamed flexible belt, an endless seamless flexible belt, an endless belt having a puzzle cut seam, and the like. It is preferred that the belt comprise a substrate in the form of an endless seamed flexible belt or seamed flexible belt, which may or may not include puzzle cut seams. Examples of such belts are described in U.S. Pat. Nos. 5,487,707; 5,514,436; and U.S. patent application Ser. No. 08/297,203 filed Aug. 29, 1994, the disclosures each of which are incorporated herein by reference in their entirety. A method of manufacturing reinforced seamless belts is set forth in U.S. Pat. No. 5,409,557, the disclosure of which is hereby incorporated by reference in its entirety.

If the substrate is a belt, sheet, film, web, endless strip, or the like, the substrate may comprise polyamide or polyimide polymers such as polyamideimide, polyimide, polyaramide, polyphthalamide; and other polymers such as polyphenylene sulfide, polyethylene naphalate, epoxies, acrylonitrile butadiene-styrenepolycarbonates (ABS), polyacrylics, polyvinylfluoride, polyethylene terephthalate (PET), polyetherether ketone (PEEK), and urethanes. Preferred urethanes include polyester, polyether, and polycaprolactone-based urethanes, available from Uniroyal, Bayer, Conap and others. Other suitable substrate materials include fabrics, metals and elastomer materials. If the substrate is in the form of a cylindrical roll or belt, the roll or belt may comprise a metal such as aluminum, tin, stainless steel, nickel or the like, or may comprise a heat resistant elastomer material such as urethanes, EPDM, nitrites, fluorocarbon elastomers, silicone rubbers, Epiclorohydrin, and the like.

In an embodiment as depicted in FIG. 9, an intermediate layer 41 is positioned between outer layer 42 and substrate 40. Examples of suitable intermediate layers include rigid and conformable polymers, including theremalset and thermoset polymers. Examples of thermoset and thermalset polymers include fluoropolymers, chloropolymers, silicone rubbers, polyimides, polyamides, polypropylenes, polyethylenes, polybutylenes, polyarylenes, acrylonitriles, polycarbonates, polysulfones, ethylene diene propene monomer, nitrile rubbers and mixtures thereof. Typically, the intermediate layer is used to impart conformability to different substrates during the printing process.

Particularly useful fluoropolymers intermediate coatings include TEFLON®-like materials such as polytetrafluoroethylene (PTFE), fluorinated ethylenepropylene copolymer (FEP), perfluorovinylalkylether tetrafluoroethylene copolymer (PFA TEFLON®), polyethersulfone, fluorosilicons, copolymers and terpolymers thereof, and the like. Also preferred are fluoroelastomers such as those described in detail in U.S. Pat. Nos. 5,166,031; 5,281,506; 5,366,772; 5,370,931; 4,257,699; 5,017,432; and 5,061,965, the disclosures each of which are incorporated by reference herein in their entirety. These fluoroelastomers, particularly from the class of copolymers, terpolymers, and tetrapolymers of vinylidenefluoride, hexafluoropropylene and tetrafluoroethylene and a possible cure site monomer, are known commercially under various designations as VITON A®, VITON E®, VITON E60C®, VITON E430®, VITON 910®, VITON GH® VITON GF®, VITON E45®, VITON A201C®, and VITON B50®. The VITON® designation is a Trademark of E.I. DuPont de Nemours, Inc. Other commercially available materials include FLUOREL 2170®, FLUOREL 2174®, FLUOREL 2176®, FLUOREL 2177® and FLUOREL LVS 76® FLUOREL® being a Trademark of 3M Company. Additional commercially available materials include AFLAS® a poly(propylene-tetrafluoroethylene) and FLUOREL II® (LII900) a poly(propylene-tetrafluoroethylenevinylidenefluoride) both also available from 3M Company, as well as the TECNOFLONS® identified as FOR-60KIR®, FOR-LHF®, NM® FOR-THF®, FOR-TFS®, TH®, TN505® available from Montedison Specialty Chemical Company. In another preferred embodiment, the fluoroelastomer is one having a relatively low quantity of vinylidenefluoride, such as in VITON GF®, available from E.I. DuPont de Nemours, Inc. The VITON GF® has about 35 weight percent of vinylidenefluoride, about 34 weight percent of hexafluoropropylene and about 29 weight percent of tetrafluoroethylene with about 2 weight percent cure site monomer. The cure site monomer can be those available from DuPont such as 4-bromoperfluorobutene- 1,1,1-dihydro-4-bromoperfluorobutene-1,3-bromoperfluoropropene-1,1,1-dihydro-3-bromoperfluoropropene-1, or any other suitable, known, commercially available cure site monomer.

Other suitable fluoropolymers include hybrid fluoroelastomers such as volume grafted fluoroelastomers, titamers, grafted titamers, ceramers, grafted ceramers, and the like.

Suitable adhesives may be present between the intermediate layer and the substrate, and/or between the intermediate layer and the outer layer. Suitable adhesives include ultraviolet thermal plastic and thermal set adhesives such as polyesters, epoxy, urethane, polyimide, polyamide, polyvinyl butyrl, silicones, and other stable high temperature adhesives.

In an embodiment depicted in FIGS. 8 and 9, preferably, the resistivity of the outer thiophene filled layer is from about 200 to about $10^{12}$ ohms/sq, preferably from about $10^4$ to about $10^{10}$ ohms/sq. In experiments, it has been shown that addition of thiophene filler to a polyimide intermediate layer resulted in the resistivity decreasing from an original before-coating resistivity of about $10^{12}$ to an after-coating of thiophene filled material to about $10^4$ ohms/sq. This decrease in resistivity by application of the thiophene filled material allows for tailoring of the resistivity for specific applications. For example in the xerographic process highly conductive devices such as a bias charging member, aquitron or other charging devices are required to charge the photoconductor.

Other areas of the xerographic machine require paper transport belts and components to be free of paper static to prevent misfeeds and paper jams.

Lowering the surface resistivity as described above, functions to enable proper xerographic charging and static dissipation.

In the embodiment wherein the thiophene filled material is used as the outer layer of a xerographic component, it is desired that the outer thiophene filled material be coated to a thickness of from about 0.5 µm to about 25 µm with a preferred range being from about 5 µm to about 5 µm. It is further described that the optional intermediate layer be coated to a thickness of from about 0.001 inches to about 0.120 inches with a preferred range being from about 0.040 inches to about 0.080 inches.

Figure 10:
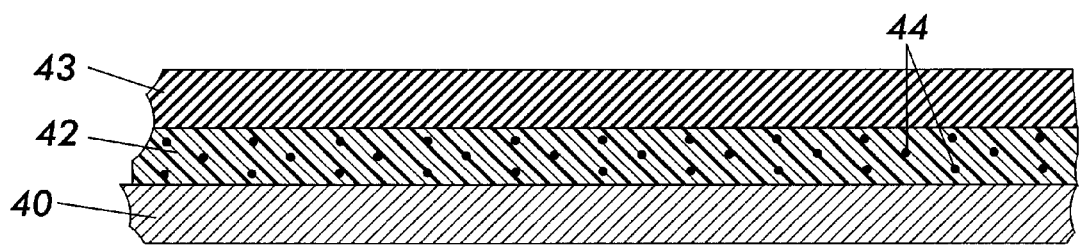
FIG. 10 is a sectional view of a xerographic component having an optional intermediate layer having a thiophene filler dispersed therein.

An alternative embodiment is shown in FIG. 10, wherein substrate 40 has thereon intermediate or adhesive thiophene 44 filled layer 42. Outer layer 43 is positioned on the thiophene filled intermediate or adhesive layer.

In the embodiment shown in FIG. 10, the substrate can be as that described for FIGS. 8 and 9, including the form of the substrate and the materials included in the substrate. The outer layer for the embodiment of FIG. 10 can comprise the materials described for the intermediate layer in the embodiments for FIGS. 8 and 9.

In the embodiment depicted in FIG. 10, it is preferred that the thickness of the outer layer be from about 0.1 µm to about 250 µm with a preferred range of from about 1 to about 75 µm.

The xerographic components may be fabricated by known methods. The coatings may be applied, for example, by gravure printing, roller application, spray coating, dipping, brush application, powder coating, or the like.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example 1

Preparation of Polyimide Substrate Coated with Thiophene filled Silicone

BAYTRON® P (thiophene filler) was mixed with silicone Emulsion 865A at various levels of from about 0.5 to about 2 percent by weight. A slight change in resistivity was observed of from about $6.88 \times 10^{11}$ to about $1.59 \times 10^{11}$ ohms/sq when the coating was coated over polyimide 300PB. The thiophene material also precipitated out at about 1.5 weight percent. The precipitate could be re-dispersed with vigorous high shear mixing.

Example 2

Preparation of Polyimide Substrate Coated with Thiophene filled Fluoroelastomer

BAYTRON® P (thiophene filler) was also dispersed into an aqueous fluoroelastomer material (FLUORLAST® from Lauren). Initial resistivity was measured at about $6.88 \times 10^{11}$ and the resistivity was reduced to about $9 \times 10^9$ ohms/sq after the layer was coated on a polyimide 300PB substrate. Again the loading of thiophene into the fluoroelastomer was from about 0.5 to about 2 weight percent.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. A xerographic component comprising:
   a) a film substrate other than a brush bristle; and thereon
   b) a coating comprising a polymer having a thiophene filler dispersed therein, wherein said xerographic component is a fuser member having heat associated therewith or an intermediate transfer member.

2. A xerographic component as claimed in claim 1, wherein said thiophene filler is present in said coating in an amount of from about 0.1 to about 25 percent by weight of total solids.

3. A xerographic component as claimed in claim 2, wherein said thiophene filler is present in said coating in an amount of from about 0.5 to about 15 percent by weight of total solids.

4. A xerographic component as claimed in claim 1, wherein said polymer in said coating is selected from the group consisting of fluoropolymers, chloropolymers, silicone rubbers, polyimides, polyamides, polypropylenes, polyethylenes, polybutylenes, polyarylenes, acrylonitriles, polycarbonates, polysulfones, ethylene diene propene monomer, nitrile rubbers and mixtures thereof.

5. A xerographic component as claimed in claim 4, wherein said polymer is selected from the group consisting of fluoropolymers and silicone rubbers.

6. A xerographic component as claimed in claim 5, wherein said fluoropolymer is selected from the group consisting of a) copolymers of vinylidenefluoride, hexafluoropropylene and tetrafluoroethylene; b) terpolymers of vinylidenefluoride, hexafluoropropylene and tetrafluoroethylene; and c) and tetrapolymers of vinylidenefluoride, hexafluoropropylene and tetrafluoroethylene and a cure site monomer.

7. A xerographic component as claimed in claim 1, wherein said thiophene filler has the following formula I:

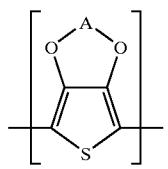

wherein A is an optionally substituted $C_1$–$C_4$ alkylene radical.

8. A xerographic component as claimed in claim 7, wherein said optionally substituted $C_1$–$C_4$ alkylene radical is selected from the group consisting of a methylene radical, alkyl-substituted methylene radical, 1,2-ethylene radical, 1,2-ethylene radical substituted by $C_1$–$C_{12}$-alkyl, 1,2-ethylene radical substituted by phenyl, and a 1,2-cyclohexylene radical.

9. A xerographic component as claimed in claim 8, wherein said thiophene filler is a polyethylene dioxythiophene.

10. A xerographic component as claimed in claim 9, wherein said thiophene filler is 3,4 polyethylenedioxythiophene.

11. A xerographic component as claimed in claim 1, wherein said xerographic component further comprises an intermediate layer positioned between said substrate and said thiophene filled polymer coating.

12. A xerographic component as claimed in claim 11, wherein said intermediate layer comprises a polymer.

13. A xerographic component as claimed in claim 12, wherein said polymer of said intermediate layer is selected from the group consisting of fluoropolymers, chloropolymers, silicone rubbers, polyimides, polyamides, polypropylenes, polyethylenes, polybutylenes, polyarylenes, acrylonitriles, polycarbonates, polysulfones, ethylene diene propene monomer, nitrile rubbers and mixtures thereof.

14. A xerographic component as claimed in claim 1, wherein said component further comprises an outer coating on said thiophene filled polymer coating.

15. A xerographic component as claimed in claim 14, wherein said thiophene filled polymer coating is an adhesive.

16. A xerographic component as claimed in claim 15, wherein said thiophene filled polymer coating further comprises polystyrene sulfonic acid.

17. A xerographic component as claimed in claim 1, wherein said film substrate is in the form of a belt.

18. A xerographic component as claimed in claim 1, wherein said film substrate comprises a polyimide.

19. A xerographic component as claimed in claim 1, wherein said film substrate is positioned on a hollow cylinder.

20. A xerographic component as claimed in claim 1, wherein said thiophene filler is 3,4 polyethylenedioxythiophene.

21. An image forming apparatus for forming images on a recording medium comprising:

a charge-retentive surface to receive an electrostatic latent image thereon;

a biasable component capable of receiving an electrical bias for charging one of a xerographic component or copy substrate surface;

a development component to apply toner to said charge-retentive surface to develop said electrostatic latent image to form a developed image on said charge retentive surface;

a transfer component to transfer the developed image from said charge retentive surface to a copy substrate; and a fuser component for fusing said developed image to a surface of said copy substrate, wherein at least one of said transfer component and said fuser component comprise:
   a) a film substrate other than a brush bristle; and thereon
   b) a coating comprising a thiophene filler dispersed therein.

\* \* \* \* \*